Figure 1:
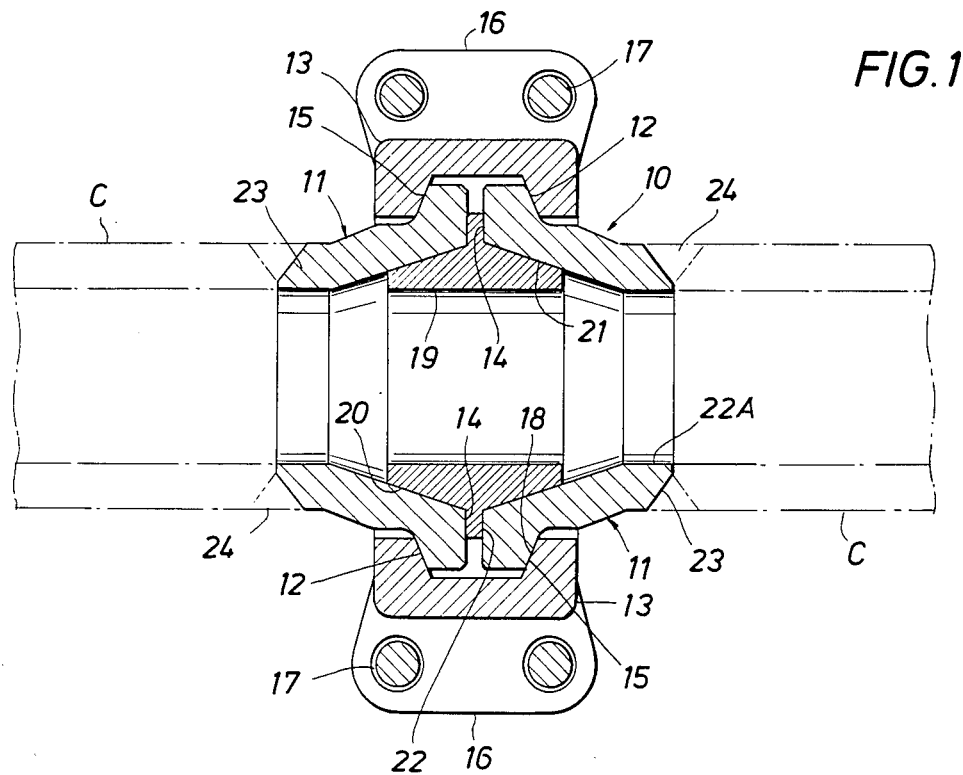

United States Patent [19]

Kujawa et al.

[11] Patent Number: 4,799,716
[45] Date of Patent: Jan. 24, 1989

[54] PROTECTOR FOR PIPE CONNECTOR HUBS

[75] Inventors: Harry F. Kujawa; Nelson A. Hinderer, both of Houston, Tex.

[73] Assignee: Oteco Equipment Company, Houston, Tex.

[21] Appl. No.: 50,086

[22] Filed: May 15, 1987

[51] Int. Cl.$^4$ ............................................. F16L 25/00
[52] U.S. Cl. ................................. 285/334.2; 138/89; 285/45
[58] Field of Search ..................... 138/89, 96 R, 96 T; 285/334.2, 45, 55

[56] References Cited

U.S. PATENT DOCUMENTS

| | | |
|---|---|---|
| 1,903,220 | 3/1933 | Lemert . |
| 1,934,681 | 11/1933 | Damsel . |
| 2,061,366 | 11/1936 | Mazurie . |
| 2,082,144 | 6/1937 | Bowers ............................ 138/96 R |
| 2,379,529 | 7/1945 | Kennedy ...................... 138/96 R X |
| 2,766,999 | 10/1956 | Watts et al. ....................... 285/334.2 |
| 3,921,673 | 11/1975 | Pero . |
| 4,185,665 | 1/1980 | Flimon ................................. 138/89 |
| 4,203,474 | 5/1980 | Lequeux . |
| 4,423,753 | 1/1984 | Smith . |

FOREIGN PATENT DOCUMENTS

| | | |
|---|---|---|
| 662591 | 7/1938 | Fed. Rep. of Germany . |
| 2840742 | 3/1980 | Fed. Rep. of Germany . |
| 3238830 | 4/1984 | Fed. Rep. of Germany . |

OTHER PUBLICATIONS

Hub Protector-Old Style.

*Primary Examiner*—Dave W. Arola
*Attorney, Agent, or Firm*—Vaden, Eickenroht, Thompson & Boulware

[57] ABSTRACT

There are disclosed two embodiments of a protector for the inner end of pipe connector hubs which have seats in their bores which are conically shaped to receive conically shaped outer faces of lips on each end of a seal ring to be held between the hubs, and flanges having conically shaped outer ends adapted to be engaged by clamping means to draw their inner ends toward one another in order to cause the seats to be sealably engaged by the faces of the lips of the seal ring. The protector includes a cup shaped body of resilient material which has a circular, inner end wall disposable over the bore of the hub and across the inner end of the flange, an annular side wall extending from the periphery of the end wall for disposal over the outer side of the flange, and a conically shaped outer end wall extending inwardly from the free end of the side wall for disposal over the full extent of the outer end of the flange of the hub.

3 Claims, 1 Drawing Sheet

PROTECTOR FOR PIPE CONNECTOR HUBS

This invention relates generally to protectors for the inner ends of pipe connector hubs. More particularly, it relates to improvements in protectors for the inner ends of hubs of this type which have conically shaped seats in their bores to receive conically shaped outer faces of lips on each end of a seal ring to be held between the hubs, and flanges having conically shaped outer ends adapted to be engaged by clamps which are in turn bolted together in order to draw the inner ends of the flanges together to cause the seats to be sealably engaged by the faces of the lips of the seal rings.

In some connectors of this type, the seal ring has an outer flange which fits between and is sealably engaged by the inner ends of the flanges as they are drawn together upon make up of the clamp bolts, and, in other cases, separate spacer rings are disposed between the inner ends of the flanges to be sealably engaged thereby. In either case, a secondary seal is formed between the flanges in addition to the primary seal between the lips of the seal ring and the seats in the bores of the hubs.

It has heretofore been proposed to provide a protector to protect both the seats in the bore of the flange and the inner ends of the flanges against physical damage as well as corrosion during storage or shipment. For this purpose, the protector comprises a body of rubber having a circular, inner end wall disposable over the bore of the hub and across the inner end of the flanges, an annular side wall extending from the periphery of the end wall for disposal about the outer side of the flanges, and a lip on the free end of the side wall for snapping into place over the radially outer edge of the outer end of the flanges to hold the body in place. Of course, since the body is made of resilient material, the inner periphery of the lip may be spread to permit assembly or disassembly of the protector.

These connectors are often made up in a pipeline by welding the ends of the hubs opposite the flanges to the free ends of the pipeline. Protectors of the type above described do not protect the outer ends of the flanges against damage which might occur during welding if, for example, the weld metal splatters onto the outer ends of the flanges, and, as a result, the weld metal may have to be removed therefrom before the clamps are made up. Also, since rubber has relatively low heat resistance, the body of the protector might melt and stick to the hub.

The primary object of this invention is to provide a hub protector of this general type which protects the hub not only during storage and/or transport, but also during its makeup in the pipeline.

This and other objects are accomplished, in accordance with the illustrated embodiments of the present invention, by a protector of the general type described, but in which the body thereof has a conically shaped annular outer end wall which extends inwardly from the free end of the side wall for disposal over the full extent of the outer end of the flange of the hub, the flexibility of the cup shaped body about the intersection of its outer end and side walls permitting the inner periphery of the outer end wall to be spread to a position in which it may be moved over the outer side of the flange during assembly or disassembly of the protector, so as to not only retain the protector in place, but also prevent weld metal from depositing on the outer end of the flange. When held opposite the outer end of the flange, the release of the inner periphery of the outer end wall of the protector body permits it to contract about and thus be drawn over the outer end of the flange in order to draw its side wall over the outer side of the flange and its inner end wall against the inner end of the flange. Thus, the conically shaped outer end of the flange acts as a cam and the the inner periphery of the conically shaped lip of the protector body acts as a follower to cause the body of the protector to be pulled into position merely upon release of the inner periphery during assembly.

More particularly, the body of the protector is of silicone or other resilient material which is highly resistant to heat, and the inner face of the protector body is so constructed as to either resist sticking or minimize the likelihood of sticking during welding. In one embodiment of the present invention, this is accomplished by a body having inner faces on its inner end wall, side wall and outer end wall which have annular recesses forming ribs which are respectively engageable with the inner end, outer side and outer end of the flange, thereby minimizing contact between the body and these respective faces of the hub. In another embodiment of the invention, a thin, flexible metal lining of aluminum foil or other suitable material is provided over the inner faces of the inner end wall, side and outer end wall of the body for respectively engaging the inner end, outer side and outer end of the flange.

Figure 2:
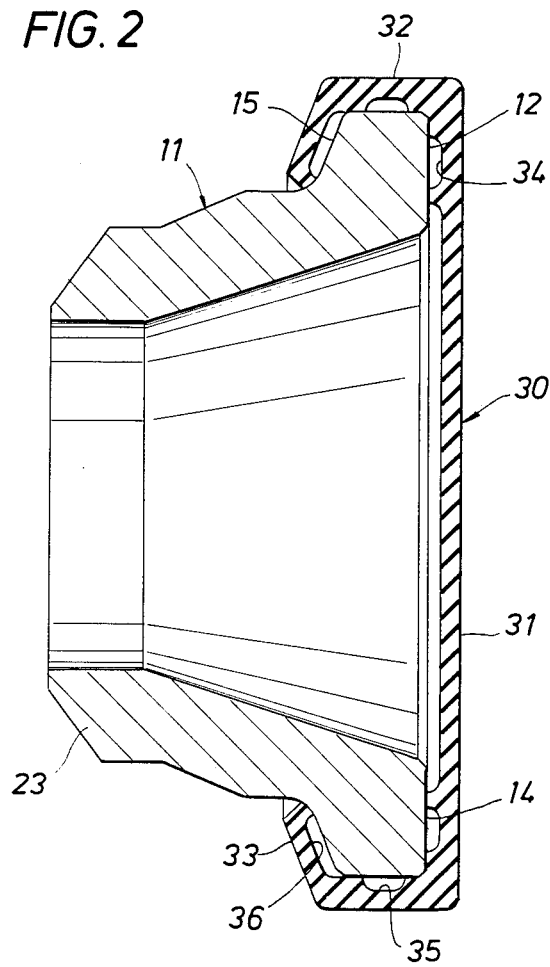
Figure 3:
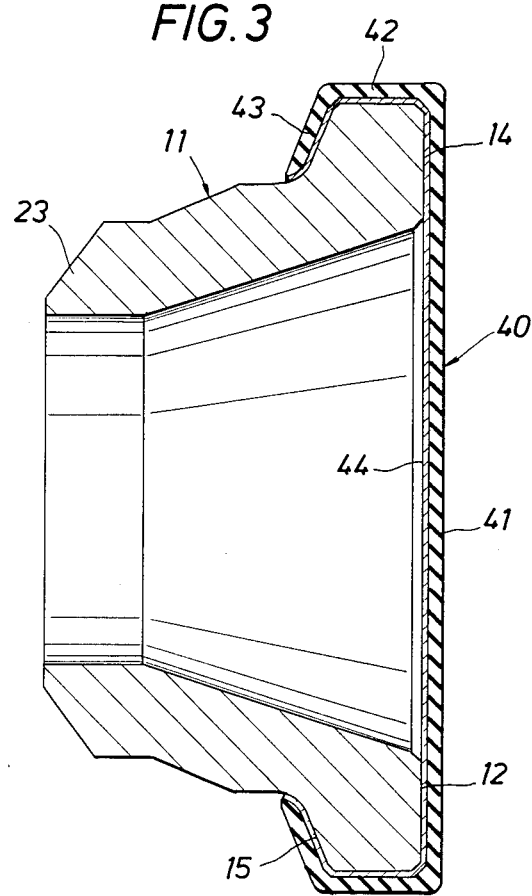

In the drawings, wherein like reference parts are used throughout the indicate like parts:

FIG. 1 a longitudinal sectional view of a connector constructed in accordance with the present invention and showing the flanges thereof engaged by clamps which are connected by bolts to fully make up the connector and further showing in broken lines the ends of the pipeline to which the outer ends of the flanges are welded;

FIG. 2 is an enlarged cross sectional view of one of the hubs with a protector constructed in accordance with one embodiment of the present invention assembled thereon; and FIG. 3 is a view similar to FIG. 2, but with a protector constructed in accordance with another alternative embodiment of the invention assembled thereon.

With reference now to the details of the above described drawings, the connector, which is indicated in its entirety by reference character 10, is shown to comprise a pair of hubs 11 each having a flange 12 whose inner end 14 is opposite the inner end of the flange of the other hub, and a pair of "C" clamps 13 engaged about the outer ends 15 of the flanges. More particularly, the clamps 13 have outer flanges 16 which are connected by bolts 17 which permit the C-clamps to be drawn radially toward one another in order to draw the inner ends of the flanges axially toward one another in order to make up the connector. Thus, as shown, and as is conventional in a connector of this type, the outer ends 15 of the flanges of the hubs are shaped conically and are engaged by similarly tapered inner faces of the C-clamps 13 so as to cam the inner ends of the flanges axially toward one another as above mentioned.

The connector also includes a seal ring 19 having lips at each end which have outer conically shaped outer faces 20 engageable with conically shaped seats 21 on the inner ends of the bores 22 through the hubs. In a connector of this type, the outer faces 20 of the lips of the seal ring 19, when unstressed, extend at a somewhat smaller angle with respect to the axis of the connector, than do the conical surfaces of the seat 21 of the bore through the hubs. Thus, the lips of the seal ring, which are made of relatively soft material, are flexed inwardly to form a large area of sealing contact between their outer faces and the seat as the hubs are drawn axially toward one another. As shown, and as previously mentioned, the seal ring 19 also includes a flange 22 which extends outwardly therefrom intermediate the lips 20 for disposal between the inner ends of the flanges as the flanges are brought together so as to form a secondary seal between the seal ring and the hubs when the clamps are fully made up.

As previously mentioned, and as shown by broken lines in FIG. 1, the connector 10 is made up between the ends "C" of a pipeline with its bore 22 forming a continuation of the opening through the pipeline. More particularly, the outer ends 23 of the hubs, as well as the ends of the pipeline, are beveled to permit them to be joined to one another by a weldment 24 therebetween. As previously described, during welding of the hubs to the ends of the pipeline, some of the weld material could splatter onto parts of the hubs including the outer ends 12 of the flanges. As also previously described, even if left in place on the hubs, prior hub connectors of the type previously described do not protect the hubs from damage during this stage of installation. That is, such prior protectors have been designed solely for the purpose of protecting the hub during storage and/or transport.

The embodiment of the protector shown in FIG. 2 comprises a cup shaped body 30 of resilient material having a circular, inner end wall 31 which, with the protector assembled on the hub, as shown in FIG. 2, is disposed on the inner end of the bore of the hub and across the inner end 14 of the flange. The body is also shown to include an annular side wall 32 which extends from the periphery of the inner end wall for disposal about the outer side of the flange, as well as a conically shaped, annular outer end wall 33 extending inwardly from the free end of the side wall for disposal over the full extent of the outer end 15 of the flange of the hub.

As shown, the inner faces of the walls of the protector body are closely engaged with the oppositely facing ends and outer side of the flange so as to be securely retained thereon. The inner end wall 31, of course, protects the seat in the bore of the hub as well as the inner end 14 of the flange of the hub as in the case of the previously described protector. In addition, the outer end wall 33 not only releasably attaches the protector to the flanges, but also protects the outer end 15 of the flange during make up of the connector in the pipeline in that it will prevent weld metal from splattering over the outer end. Furthermore, the protector body is preferably made of a material such as silicone which is not only resilient to permit the protector to be assembled and disassembled as previously described, but also resists melting during welding since it has a melting temperature of about 600° F. In addition, the inner faces of the walls of the protector body are of such construction as to minimize any sticking which might occur. Thus, as shown in FIG. 2, recesses 34, 35 and 36 are formed in the inner faces of the inner and outer end walls and side wall of the protector body to form annular ribs which engage the flange along limited areas.

The protector constructed in accordance with the other embodiment of the present invention is shown in FIG. 3 to comprise, like the protector 30, a cup shaped body 40 having a circular inner end wall 41 which is disposed over the inner end 14 of the flange of the hub and covers the bore through the hub. As in the case of the body of the protector 30, it also includes an annular side wall 42 which extends from the periphery of the end wall for disposal about the outer side of the flange of the hub, and a conically shaped outer end wall 43 for disposal over the full extent of the outer end 15 of the flange of the hub. Thus, insofar as it protects the hub during storage and/or shipment, as well as the outer end 15 of the flange against splattering of the weld metal, the protector in FIG. 3 functions in the same way as that of FIG. 2. It differs, however, in the manner in which the inside of the end walls and side wall of the body are constructed in order to reduce the likelihood of sticking to the flange of the hub. Thus, in the case of the protector of FIG. 3, an inner wall 44 of a thin, flexible metal, such as aluminum foil, lines the inner end wall, side wall and outer end wall of the body 40 so as to closely engage with the oppositely facing surfaces on the inner and outer ends and outer side of the flange.

Both embodiments of the protector are assembled and disassembled with respect to the hub in the same manner. Thus, the body of each is flexible about the intersection of its inner end wall and side wall to permit the inner periphery of the outer end wall to be spread to such an extent that it may be moved over the outer side of the flange during either assembly or disassembly. In the process of assembling the protector, the periphery of the outer end wall is held in a spread condition until it moves inwardly over the outer side of the flange and into a position radially opposite the conically shaped outer end 15 of the flange. Thus, upon release of the inner periphery of the outer end wall, the periphery of the outer end wall will contact radially inwardly until it engages the conically shaped outer end 15 of the flange. The flange will therefore act as a cam to cause the conically shaped inner face of the outer end wall of the protector body to slide downwardly therealong until it draws the inner face of the inner end wall against the inner ends of the protector flanges and the inner face of the annular side wall of the protector body into a position over the outer side of the flange.

From the foregoing it will be seen that this invention is one well adapted to attain all of the ends and objects hereinabove set forth, together with other advantages which are obvious and which are inherent to the protector for pipe connector hubs.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

We claim:

1. A protector for the inner ends of pipe-connector hubs having seats in their bores which are conically shaped to receive conically shaped outer faces of lips on each end of a seal ring to be held between the hubs, and flanges having conically shaped outer ends adapted to be engaged by clamping means to draw their inner ends toward one another in order to cause the seats to be sealably engaged by the faces of the lips of the seal ring, said protector comprising a cup shaped body of resilient material of relatively high heat resistance and having a circular inner end wall disposable over the bore of the hub and across the inner end of the flange, an annular side wall extending from the periphery of the end wall for disposal about the outer side of the flange, and a conically shaped, annular outer end wall extending inwardly from the free end of the side wall for disposal over the full extent of the outer end of the flange of the hub, said cup-shaped body having an inner face on each wall and being flexible about the intersection of its inner end wall and side wall to permit the inner periphery of its outer end wall to be spread to a position in which it may be moved over the outer side of the flange during assembly or disassembly of the protector, and whereby the inner periphery may be released during assembly, and when opposite the outer end of the flange, to permit it to contract about the outer end of the flange in order to draw the outer end wall over the outer end of the flange, the side wall over the outer side of the flange and its end wall against the inner end of the flange, and the body having means on the inner faces of its inner end wall, side wall and outer end wall which during welding of the outer end of the hub in a pipeline minimizes sticking of the inner faces to the flange.

2. A protector as in claim 1, wherein said means on the inner faces of the inner end wall, side wall and outer end wall of the body include annular recesses which form ribs which are respectively engageable with the inner end, outer side and outer end of the flange.

3. A protector as in claim 1, wherein said means includes a thin, flexible metal lining for the inner faces of the inner end wall, side wall and outer end wall of the body for respectively engaging the inner end, outer side and outer end of the flanges.

* * * * *